(12) United States Patent
Manohar (10) Patent No.: US 7,702,343 B2
(45) Date of Patent: Apr. 20, 2010

(54) EFFICIENT GAP ALLOCATION FOR CELL MEASUREMENTS IN ASYNCHRONOUS COMMUNICATION NETWORKS

(75) Inventor: Bollapragada Venkata Janaki Manohar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1057 days.

(21) Appl. No.: 11/098,902

(22) Filed: Apr. 4, 2005

(65) Prior Publication Data

US 2006/0223557 A1 Oct. 5, 2006

(51) Int. Cl.
*H04B 7/00* (2006.01)
*H04B 15/00* (2006.01)
*H04B 7/19* (2006.01)
*H04B 1/16* (2006.01)
*H04W 36/00* (2009.01)
*H04B 7/216* (2006.01)
*H04J 3/00* (2006.01)
*H04B 1/00* (2006.01)
*H04L 7/00* (2006.01)

(52) U.S. Cl. ............... 455/502; 455/13.2; 455/208; 455/436; 370/335; 370/345; 375/145; 375/356

(58) Field of Classification Search ............ 455/67.11, 455/67.14, 69, 51.1, 502, 436, 437, 438, 455/439, 440, 441, 442, 443, 444, 553.1, 455/13.2, 181.1, 208, 324, 410, 456.1, 525, 455/FOR. 108; 375/356, 357, 358, 145, 375/149, 293, 355, 362, 363, 364, 365, 366, 375/368, 370; 370/331, 324, 330, 332, 342, 370/335, 337, 345, 347, 465, 509

See application file for complete search history.

(56) References Cited

U.S. PATENT DOCUMENTS

| 6,122,270 | A | 9/2000 | Whinnett et al. |
| 7,024,194 | B1 * | 4/2006 | Oksanen ............... 455/437 |
| 7,372,842 | B2 * | 5/2008 | Kim et al. .............. 370/345 |
| 2003/0109256 | A1 * | 6/2003 | Holcman ............... 455/436 |
| 2005/0043046 | A1 * | 2/2005 | Lee ....................... 455/502 |
| 2005/0277416 | A1 * | 12/2005 | Tolli et al. ............. 455/436 |

FOREIGN PATENT DOCUMENTS

| WO | 2004091231 A1 | 10/2004 |
| WO | 0239758 A2 | 5/2005 |

* cited by examiner

*Primary Examiner*—Nay A Maung
*Assistant Examiner*—Paul P Tran
(74) *Attorney, Agent, or Firm*—Kenyen S. Jenckes; Kristine U. Ekwueme (57) ABSTRACT

Techniques for allocating transmission gaps and making cell measurements in asynchronous communication networks are described. A terminal establishes communication with a first communication network (e.g., a W-CDMA network), receives an initial allocation of transmission gaps for making cell measurements, and makes measurements for cells in a second communication network (e.g., a GSM network) during the allocated transmission gaps. The terminal determines the timing of at least one cell in the second network, which is asynchronous with the first network, and sends the cell timing to the first network. The terminal then receives a new allocation of transmission gaps for making cell measurements. The locations of the transmission gaps in the new allocation are determined based on the cell timing reported by the terminal. The terminal makes measurements for the at least one cell in the second network during the transmission gaps in the new allocation.

44 Claims, 9 Drawing Sheets

EFFICIENT GAP ALLOCATION FOR CELL MEASUREMENTS IN ASYNCHRONOUS COMMUNICATION NETWORKS

BACKGROUND

I. Field

The present invention relates generally to communication, and more specifically to cell measurements in asynchronous communication networks.

II. Background

Wireless communication networks are widely deployed to provide various communication services such as voice, packet data, and so on. These wireless networks may be capable of supporting multiple users by sharing the available system resources. Examples of such wireless networks include Code Division Multiple Access (CDMA) networks, Time Division Multiple Access (TDMA) networks, and Frequency Division Multiple Access (FDMA) networks. These wireless networks may also utilize various radio access technologies (RATs) such as Wideband-CDMA (W-CDMA), cdma2000, Global System for Mobile Communications (GSM), and so on, all of which are well known in the art.

A multi-mode terminal is capable of communicating with multiple wireless networks, such as a GSM network and a W-CDMA network. The multi-mode terminal typically communicates with a serving cell in only one wireless network at any given moment but periodically makes measurements for cells in the other wireless network. The cell measurements allow the terminal to ascertain whether any cell in the other wireless network is better than the current serving cell. This may be the case, for example, if the terminal is mobile and moves to a different coverage area. If a better cell in the other wireless network is found, as indicated by the cell measurements, then the terminal may attempt to switch to the other wireless network and receive service from the better cell.

Each cell in a GSM network periodically transmits a synchronization burst that allows the terminals to make measurements for that cell. Each GSM cell transmits its synchronization burst at specific time instances determined by the timing of that cell. The GSM and W-CDMA networks may operate asynchronously so that the timing of the cells in the GSM network cannot be ascertained based on the timing of the cells in the W-CDMA network, and vice versa. Furthermore, the cells in each network may operate asynchronously of one another. The asynchronous operation at the network and cell levels complicates cell measurement.

There is therefore a need in the art for techniques to efficiently make cell measurements in asynchronous communication networks.

SUMMARY

Techniques for allocating transmission gaps and for making cell measurements in asynchronous communication networks are described herein. In an embodiment, a terminal establishes communication (e.g., sets up a voice call) with a first communication network (e.g., a W-CDMA network), receives an initial allocation of transmission gaps for making cell measurements, and makes measurements for cells in a second communication network (e.g., a GSM network) during the allocated transmission gaps. The terminal determines the timing of at least one cell in the second network, which is asynchronous with the first network, and sends the cell timing to the first network. The terminal then receives from the first network a new allocation of transmission gaps for making cell measurements. The locations of the transmission gaps in the new allocation are determined based on the timing of the at least one cell reported by the terminal. The terminal thereafter makes measurements for the at least one cell in the second network during the transmission gaps in the new allocation.

The terminal may also determine the timing of the cells in the second network based on measurements made for these cells prior to establishing communication with the first network. The terminal may then send the cell timing to the first network during the call setup.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

The gap allocation and cell measurement techniques described herein may be used for various asynchronous communication networks. For clarity, these techniques are specifically described below for GSM and W-CDMA networks.

Figure 1:
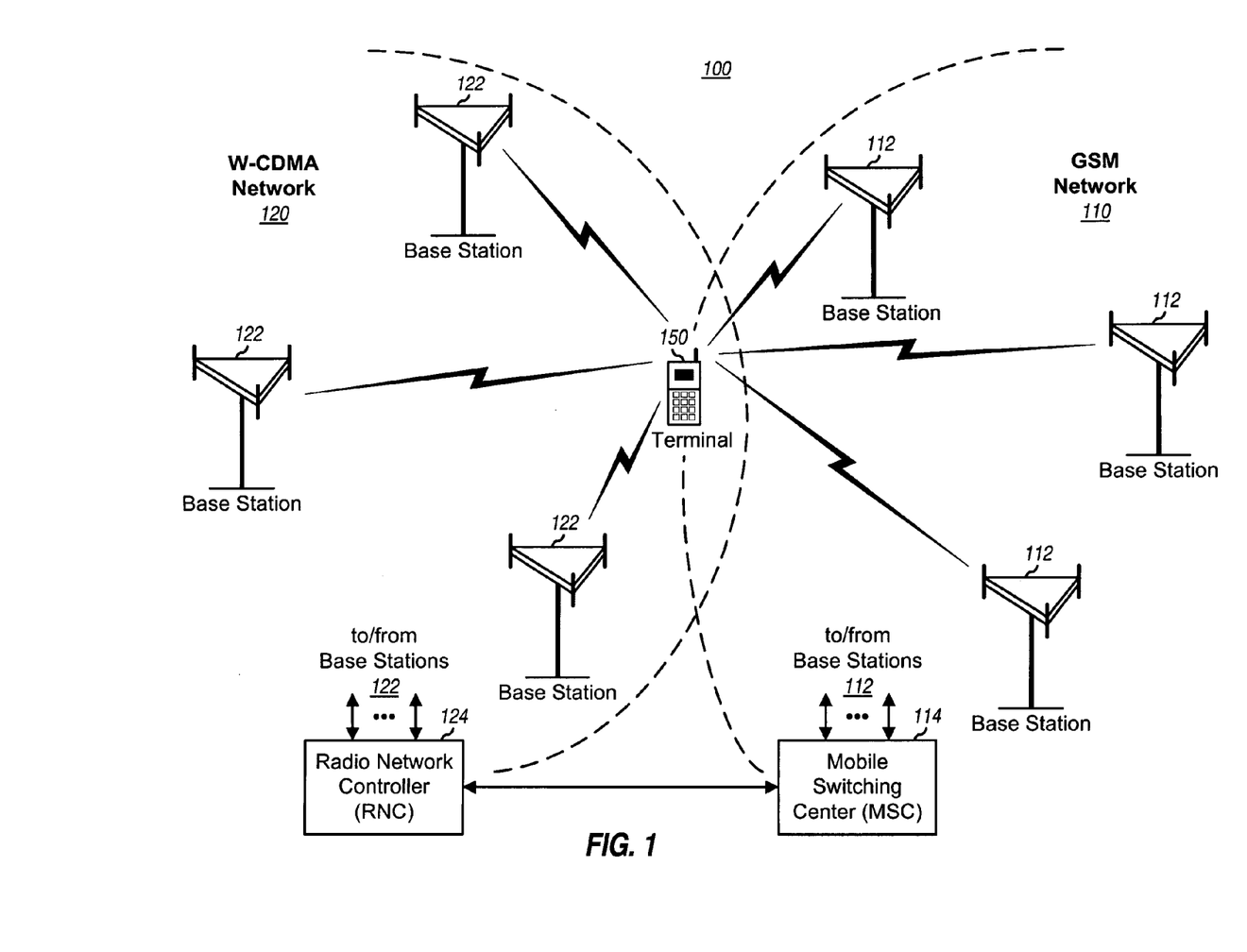
FIG. 1 shows a GSM network and a W-CDMA network.

FIG. 1 shows a public land mobile network (PLMN) 100 that includes a GSM network 110 and a W-CDMA network 120. The terms "network" and "system" are often used interchangeably. GSM is a radio access technology (RAT) that can provide voice service and low to medium rate packet data service. GSM networks are widely deployed throughout the world. W-CDMA is a new radio access technology that can provide enhanced services and capabilities, e.g., higher data rates, concurrent voice and data calls, and so on. A W-CDMA network is also commonly called a Universal Terrestrial Radio Access Network (UTRAN). GSM network 110 and W-CDMA network 120 are two wireless networks employing different radio access technologies (GSM and W-CDMA) but belonging to the same PLMN. GSM and W-CDMA are described in documents from a consortium named "3rd Generation Partnership Project" (3GPP).

GSM network 110 and W-CDMA network 120 each include multiple cells, where a "cell" can refer to a base station and/or its coverage area, depending on the context in which the term is used. GSM network 110 includes base stations 112 that provide communication for terminals within the coverage area of the GSM network. A base station is a fixed station used for communicating with the terminals and may also be called a Node B, a base transceiver station (BTS), an access point, or some other terminology. A mobile switching center (MSC) 114 couples to base stations 112 and provides coordination and control for these base stations. W-CDMA network 120 includes base stations 122 that provide communication for terminals within the coverage area of the W-CDMA network. A radio network controller (RNC) 124 couples to base stations 122 and provides coordination and control for these base stations. MSC 114 communicates with RNC 124 to support interworking between the GSM and W-CDMA networks.

A multi-RAT terminal 150 (e.g., a dual-mode cellular phone) has the capability to communicate with GSM network 110 and W-CDMA network 120, typically with one wireless network at any given moment. This capability allows a user to obtain the performance advantages of W-CDMA and the coverage benefits of GSM with the same terminal. Terminal 150 may be fixed or mobile and may also be called a user equipment (UE), a mobile station (MS), a mobile equipment (ME), a wireless communication device, a subscriber unit, or some other terminology.

Figure 2:
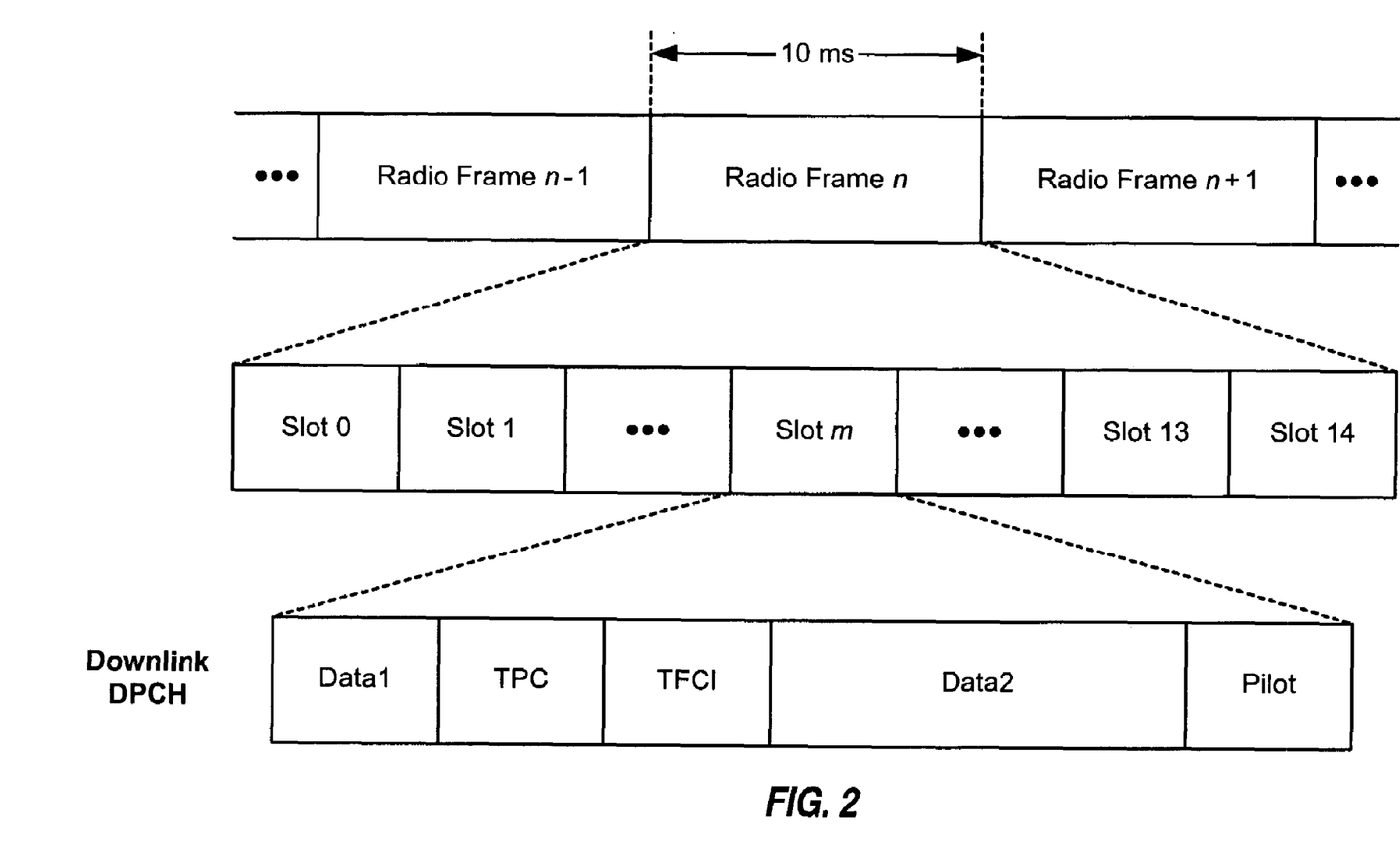
FIG. 2 shows a framing structure for the downlink in W-CDMA.

FIG. 2 shows a framing structure for the downlink in W-CDMA. This framing structure is used for a downlink dedicated physical channel (DPCH), which carries user-specific data for a terminal. The timeline for data transmission is divided into radio frames. Each radio frame is identified by a 12-bit system frame number (SFN) that is transmitted on a control channel. The SFN is reset to zero at a specific time, is incremented by one for each radio frame thereafter, and wraps around to zero after reaching the maximum value of 4095.

Each radio frame has a duration of 10 milliseconds (ms) and is further partitioned into 15 slots, which are labeled as slot 0 through slot 14. Each slot includes two data fields (Data1 and Data2) used to send user-specific data, a transmit power control (TPC) field used to send power control information, a transport format combination indicator (TFCI) field used to send format information (e.g., bit rate, channelization code, and so on), and a pilot field used to send a pilot.

Figure 3:
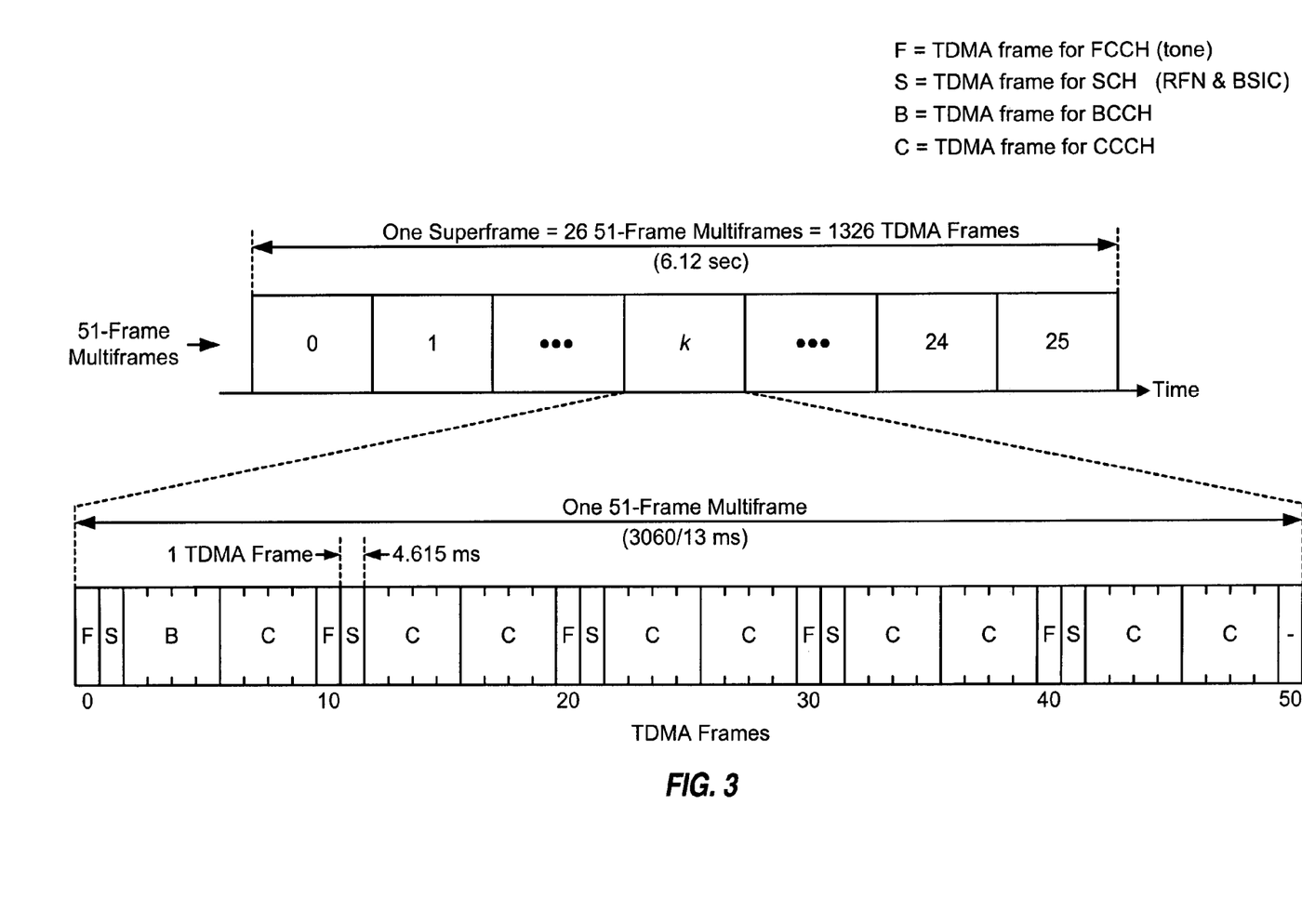
FIG. 3 shows a framing structure in GSM.

FIG. 3 shows a framing structure in GSM. The timeline for data transmission is divided into superframes. Each superframe has a duration of 6.12 seconds and includes 1326 TDMA frames. A superframe can be partitioned into either 26 51-frame multiframes (as shown in FIG. 3) or 51 26-frame multiframes.

The control/overhead channels in GSM use the 51-frame multiframe structure. Each 51-frame multiframe includes 51 TDMA frames, which are labeled as TDMA frames 0 through 50. Each TDMA frame has a duration of 4.615 ms. The control channels for GSM include a frequency correction channel (FCCH), a synchronization channel (SCH), a broadcast control channel (BCCH), and a common control channel (CCCH). The FCCH carries a tone that allows the terminals to obtain frequency and coarse timing information for the GSM cell transmitting the FCCH. The FCCH is sent in TDMA frames 0, 10, 20, 30 and 40 of each 51-frame multiframe. The SCH carries (1) a reduced TDMA frame number (RFN) that is used by the terminals to synchronize their timing and frame numbering and (2) a base transceiver station identity code (BSIC) that identifies the GSM cell transmitting the SCH. The SCH is sent in TDMA frames 1, 11, 21, 31 and 41 of each 51-frame multiframe. The BCCH carries system information and is sent in TDMA frames 2, 3, 4 and 5 of each 51-frame multiframe. The CCCH carries control information and is also used to implement a paging channel (PCH), which carries paging messages for idle terminals. The channel organization for the control channels in GSM is described in a document 3GPP TS 05.01, which is publicly available.

GSM network 110 operates on one or more frequency bands. Each frequency band covers a specific range of frequencies and is divided into a number of 200 kHz radio frequency (RF) channels. Each RF channel is identified by a specific ARFCN (absolute radio frequency channel number). For example, the GSM 900 frequency band includes ARFCNs 1 through 124, the GSM 1800 frequency band includes ARFCNs 512 through 885, and the GSM 1100 frequency band includes ARFCNs 512 through 810.

Each GSM cell transmits traffic and overhead data on a set of RF channels assigned to that cell by a network operator. To reduce inter-cell interference, GSM cells located near each other are assigned different sets of RF channels, so that the transmissions from these cells do not interfere one another. Each GSM cell transmits the FCCH, SCH, and BCCH on one or more of the RF channels assigned to that cell. An RF channel used to transmit these control channels is called a BCCH carrier.

Each GSM cell that supports Release 99 or a later version of the GSM standard and each W-CDMA cell broadcasts a BCCH allocation list, which is commonly called a BA list or a neighbor cell list. The neighbor cell list contains up to 32 GSM neighbor cells and up to 64 W-CDMA neighbor cells distributed across up to three W-CDMA frequencies. The neighbor cell list indicates (1) the ARFCN of the BCCH carrier and the BSIC of each GSM neighbor cell and (2) the universal ARFCN (UARFCN) and the scrambling code of each W-CDMA neighbor cell.

Terminal 150 obtains a neighbor cell list from its serving cell and performs measurements for the GSM and W-CDMA neighbor cells in the list, as specified by 3GPP. While in communication with the serving cell, the terminal periodically makes measurements for cells in the neighbor cell list to look for better cells. The neighbor cells may be in the same network as that of the serving cell or may be in a different network. For GSM, neighboring cells transmit on different RF channels in order to avoid intra-cell interference. For W-CDMA, each cell may transmit on any of the frequencies in one of three W-CDMA frequency bands with a unique scrambling code. Thus, in order to make measurements for neighbor cells in the same or different network, the terminal may need to tune its RF receiver away from the RF frequency/channel used by the serving cell. While tuned away, the terminal is not able to receive data from or transmit data to the serving cell. GSM and W-CDMA both provide mechanisms to allow the terminal to make measurements for neighbor cells without losing data from the serving cell.

GSM defines idle frames to provide the terminal with some time to make measurements for neighbor cells. In each idle frame, which occurs every 26 TDMA frames, the terminal can tune away from the serving cell, make measurements for the neighbor cells, and then tune back to the serving cell. Since no data is transmitted during the idle frames, the terminal can make measurements without losing data from downlink/uplink transmissions.

Each W-CDMA cell continuously transmits a pilot that is scrambled with a scrambling code assigned to that cell. Since a W-CDMA pilot is continuous, the terminal can capture the pilot of any W-CDMA cell during any GSM idle frame. The terminal can process the received pilot from a W-CDMA cell to determine the timing, identity, and received signal strength of that W-CDMA cell. Because of the continuous W-CDMA pilot, the terminal can easily make measurements for W-CDMA neighbor cells during the idle frames when communicating with the GSM network.

W-CDMA supports a compressed mode on the downlink to provide gaps in transmission that allow the terminal to make measurements for neighbor cells. In the compressed mode, the W-CDMA serving cell transmits data to the terminal during only a portion of a radio frame, which then creates a transmission gap in the remaining portion of the frame. The terminal can temporarily leave the W-CDMA network during the transmission gap to make measurements for neighbor cells on a different frequency and/or in a different wireless network without losing data from the serving cell.

Figure 4:
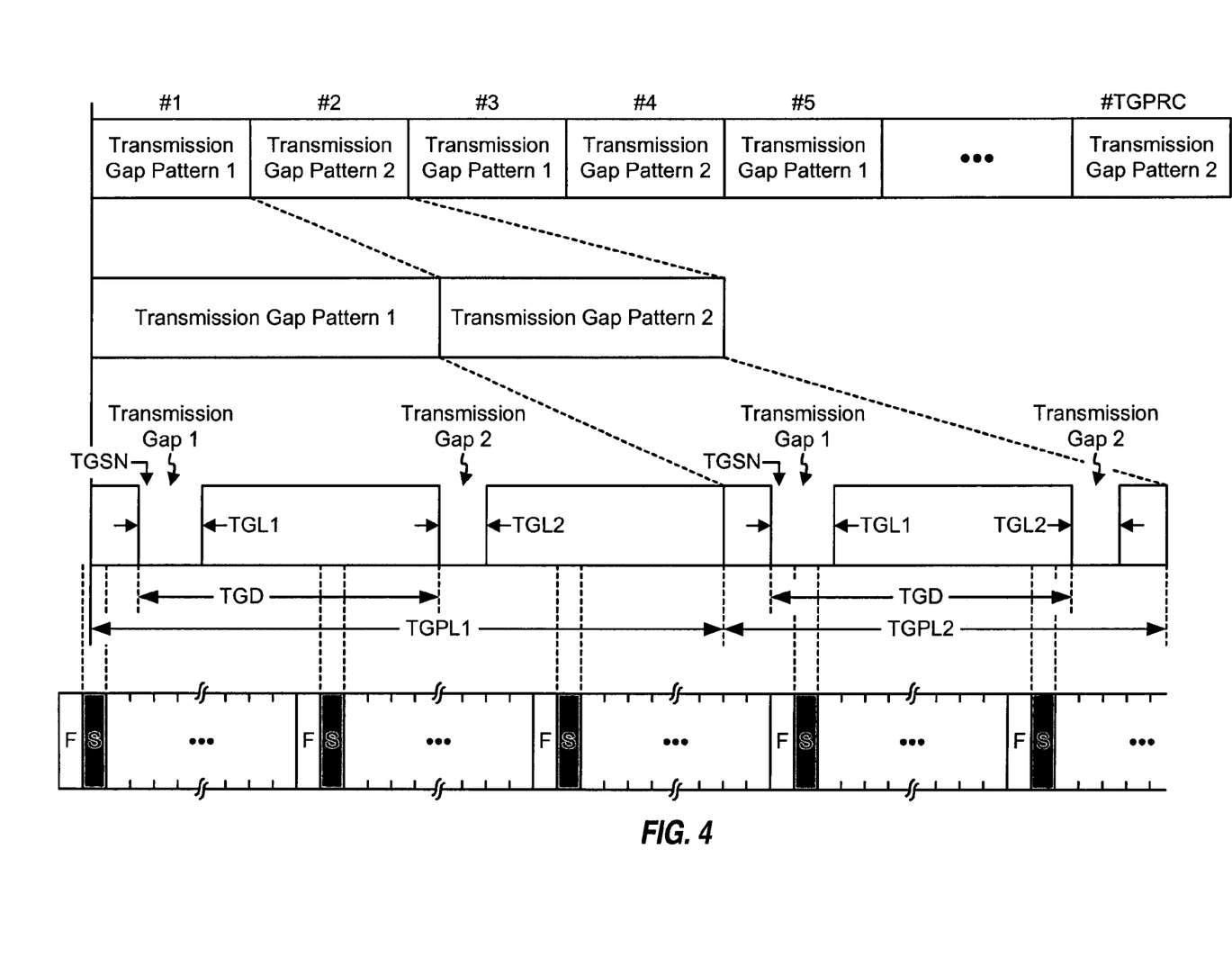
FIG. 4 shows a compressed mode transmission in W-CDMA.

FIG. 4 shows a compressed mode transmission in W-CDMA. In the compressed mode, user-specific data for the terminal is transmitted in accordance with a transmission gap pattern sequence, which consists of alternating transmission gap patterns 1 and 2. Each transmission gap pattern includes one or two transmission gaps. Each transmission gap may occur entirely within one radio frame or may span across two radio frames. The transmission gap pattern sequence is defined by the following parameters:

TGPRC (transmission gap pattern repetition count)—the number of transmission gap patterns within the transmission gap pattern sequence.

TGSN (transmission gap starting slot number)—the slot number of the first transmission gap slot in the transmission gap pattern (slot 1 to 14).

TGL1 (transmission gap length 1)—the duration of the first transmission gap in each transmission gap pattern (1 to 14 slots).

TGL2 (transmission gap length 2)—the duration of the second transmission gap in each transmission gap pattern (1 to 14 slots).

TGD (transmission gap distance)—the duration between the starting slots of the first and second transmission gaps (15 to 269 slots).

TGPL1 (transmission gap pattern length 1)—the duration of transmission gap pattern 1 (1 to 144 frames).

TGPL2 (transmission gap pattern length 2)—the duration of transmission gap pattern 2 (1 to 144 frames).

The compressed mode is described in 3GPP TS 25.212 (section 4.4), 25.213 (sections 5.2.1 an 5.2.2), and 25.215 (section 6.1), all of which are publicly available.

The terminal may communicate with the W-CDMA network, e.g., for a voice call. The terminal may receive from the W-CDMA serving cell a neighbor cell list that contains W-CDMA and GSM neighbor cells. The terminal makes measurements and identifies cells that are candidates for handover. Handover may occur if the terminal moves away from the W-CDMA coverage area and into the GSM coverage area. The W-CDMA network allocates one or more transmission gap pattern sequences to allow the terminal to make measurements for W-CDMA and GSM cells.

Each GSM cell transmits the FCCH and SCH on specific TDMA frames, as shown in FIG. 3. Each transmission of the SCH is also called an SCH burst, an SCH transmission, a synchronization burst, a signaling burst, and so on. The terminal can typically obtain the received signal strength for a given GSM cell based on a power measurement made during any portion of the transmission from the GSM cell. However, the terminal can obtain the RFN and BSIC for the GSM cell only if the terminal processes the proper ARFCN at the proper time interval during which the SCH is transmitted by that GSM cell. If the terminal does not have timing information for the GSM cell, which is often the case for a neighbor cell that has not been measured and identified, then the terminal may need to make many measurements at different times in order to capture the SCH for that GSM cell.

FIG. 4 shows the timing relationship between the SCH for one GSM cell and the transmission gaps in the transmission gap pattern sequence sent by the W-CDMA network to the terminal. The W-CDMA and GSM networks are typically operated asynchronously. Consequently, the W-CDMA network does not have knowledge of the timing of the cells in the GSM network. The transmission gaps allocated to the terminal by the W-CDMA network thus appear at random locations with respect to the SCH bursts for the GSM cell. The terminal continually makes measurements for the GSM cell in the allocated transmission gaps and tries to decode the BSIC in each transmission gap. Since the transmission gaps are arbitrarily placed with respect to the SCH bursts, the terminal may not be able to decode in the BSIC in many transmission gaps. The terminal is able to obtain the BSIC and the timing of the GSM cell whenever an SCH burst aligns with a transmission gap.

For the example shown in FIG. 4, the first, second, third and fifth SCH bursts are not time aligned with any transmission gap. Hence, the terminal is not able to recover the RFN and BSIC from these SCH bursts. The fourth SCH burst falls within transmission gap 1 in transmission gap pattern 2 and can be measured by the terminal. For the example shown in FIG. 4, three out of four transmission gaps are wasted. Wasted transmission gaps are undesirable since they do not provide the desired information, burden the network, and may result in higher power consumption by the terminal to process the signal from the GSM cell. All of these effects are undesirable.

Figure 5:
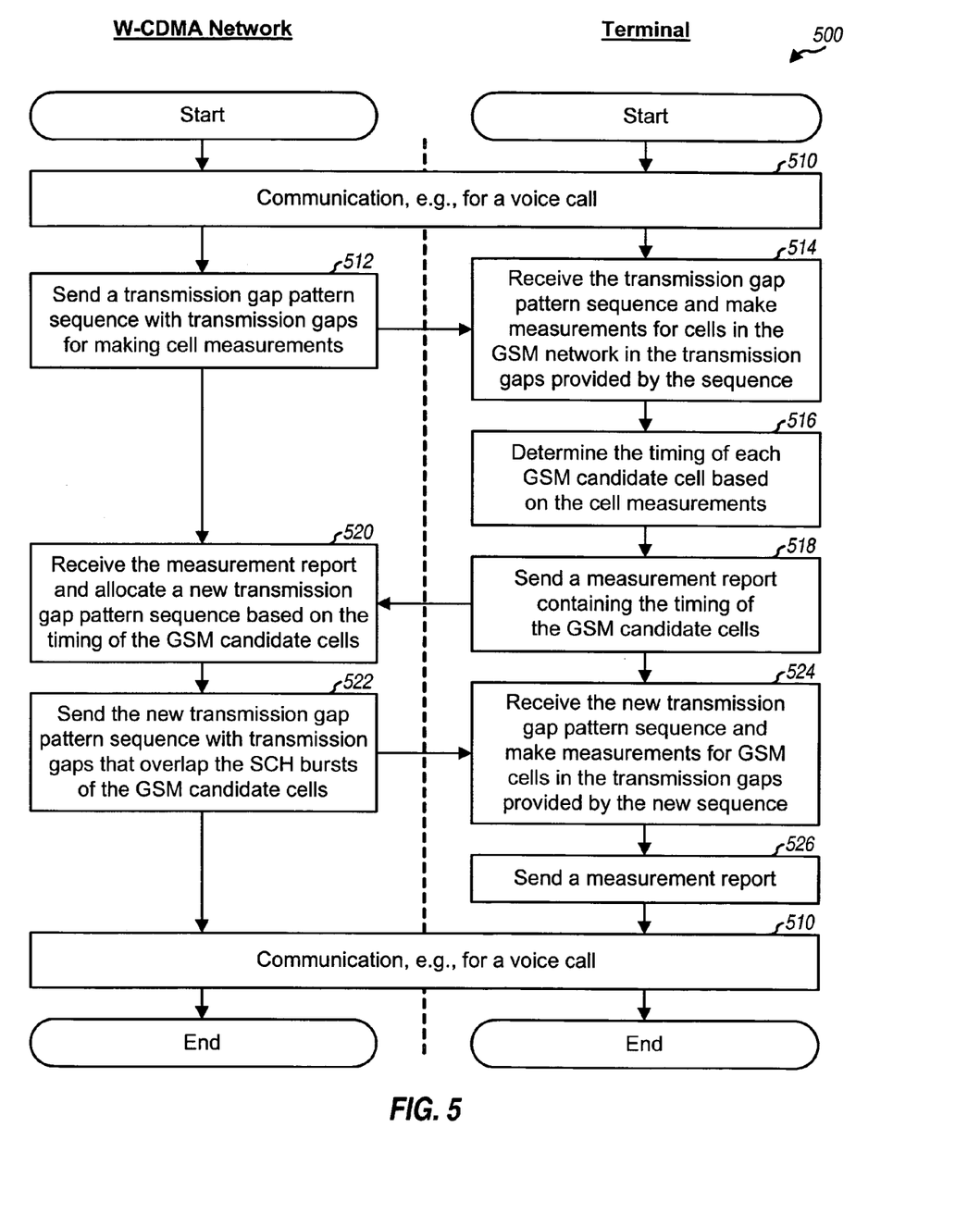
FIG. 5 shows a process for efficiently making measurements for GSM cells while in communication with the W-CDMA network.

FIG. 5 shows a process 500 for efficiently making cell measurements in GSM and W-CDMA networks. The terminal communicates with the W-CDMA network, e.g., for a voice call (block 510). The serving cell in the W-CDMA network sends to the terminal a transmission gap pattern sequence with transmission gaps for making cell measurements (block 512). The transmission gaps in this sequence are arbitrarily placed with respect to the SCH bursts transmitted by the cells in the GSM network.

The terminal receives the transmission gap pattern sequence and makes measurements for cells in the GSM network in the transmission gaps provided by the sequence (block 514). The terminal typically makes measurements for GSM cells in the neighbor cell list and may also make measurements for other GSM cells that are identified by the terminal's own searches. The terminal identifies GSM candidate cells, which may be cells with received signal strength exceeding a predetermined threshold. The terminal also determines the timing of each GSM candidate cell, which may be given with respect to the timing of the W-CDMA serving cell (block 516). For example, the terminal may compute a time difference for each GSM candidate cell as the difference between the timing of the GSM cell and the timing of the W-CDMA serving cell. The terminal then sends to the W-CDMA network a measurement report that contains pertinent information as well as the timing of the GSM candidate cells (block 518).

The W-CDMA network receives the measurement report from the terminal and allocates a new transmission gap pattern sequence based on the timing of the GSM candidate cells (block 520). The transmission gaps in the new transmission gap pattern sequence are defined such that the SCH bursts for the GSM candidate cells fall within these transmission gaps. The W-CDMA network allocates a sufficient number of transmission gaps for each GSM candidate cell and minimizes unnecessary transmission gaps that do no coincide with the SCH burst of any GSM candidate cell. The serving cell in the W-CDMA network then sends the new transmission gap pattern sequence to the terminal (block 522).

The terminal receives the new transmission gap pattern sequence and makes measurements for GSM cells in the transmission gaps provided by the new sequence (block 524). For example, the terminal may make measurements periodically to reconfirm that the GSM candidate cells are still received with sufficient signal strength. The terminal may periodically send to the W-CDMA network a measurement report that contains pertinent information as well as updated timing of the GSM candidate cells (block 526). Blocks 514 through 526 may be performed as needed during the call with the W-CDMA network.

For the embodiment shown in FIG. 5, the terminal makes measurements for GSM cells after establishing communication with the W-CDMA network. In another embodiment, the terminal makes measurements for GSM cells prior to establishing communication with the W-CDMA network and obtains the timing of the GSM candidate cells. For example, the terminal may make these measurements while in an idle mode and not communicating with any wireless network or while in communication with the GSM network. In yet another embodiment, the terminal obtains the timing of GSM candidate cells based on measurements made for these cells prior to establishing communication with the W-CDMA network. For both of these embodiments, the terminal can provide the timing of the GSM candidate cells during call setup with the W-CDMA network. The transmission gaps in the first transmission gap pattern sequence provided by the W-CDMA network are then time aligned with the SCH bursts for the reported GSM cells.

Figure 6:
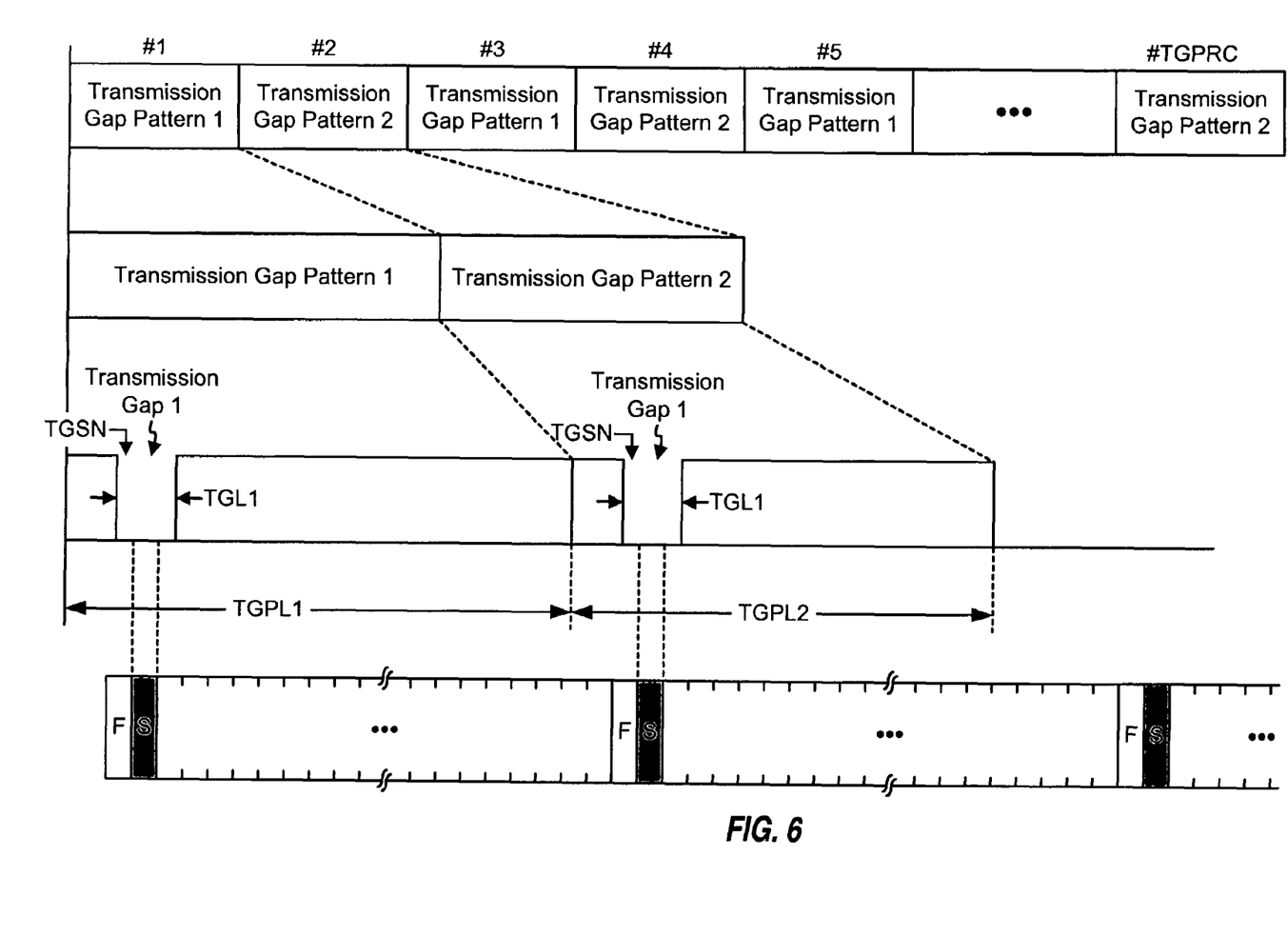
FIG. 6 shows a compressed mode transmission with transmission gaps that are time aligned with SCH bursts for one GSM cell.

FIG. 6 shows the timing relationship between the SCH bursts for one GSM cell and the transmission gaps in the new transmission gap pattern sequence for the terminal. For this example, each transmission gap pattern in the new sequence has one transmission gap, and the SCH bursts are time aligned with the two transmission gaps in transmission gap patterns 1 and 2 in the new sequence. The terminal is able to recover the RFN and BSIC from the SCH bursts transmitted during these transmission gaps. No transmission gaps are wasted for the example shown in FIG. 6. Furthermore, fewer transmission gaps may be needed because the measurement for each transmission gap yields useful information.

FIG. 6 shows a simple example in which each SCH burst for the GSM cell falls within a transmission gap. The terminal typically only needs to measure the GSM cell periodically. The measurement rate may be determined by various factors such as the opportunities available to the terminal for making cell measurements. The W-CDMA network may define the transmission gap pattern sequence such that the transmission gaps overlap the SCH bursts for the GSM cell at a sufficient rate.

FIGS. 4 and 6 show an example for one GSM cell. FIG. 5 also shows the W-CDMA network sending one transmission gap pattern sequence to the terminal. The terminal may report up to six GSM candidate cells to the W-CDMA network. The W-CDMA network may then send one or more transmission gap pattern sequences to the terminal for making cell measurements. The number of transmission gap pattern sequences allocated to the terminal is typically dependent on the number of candidate cells reported by the terminal. The allocated transmission gaps are determined based on the timing of all of the GSM candidate cells reported by the terminal.

Figure 7:
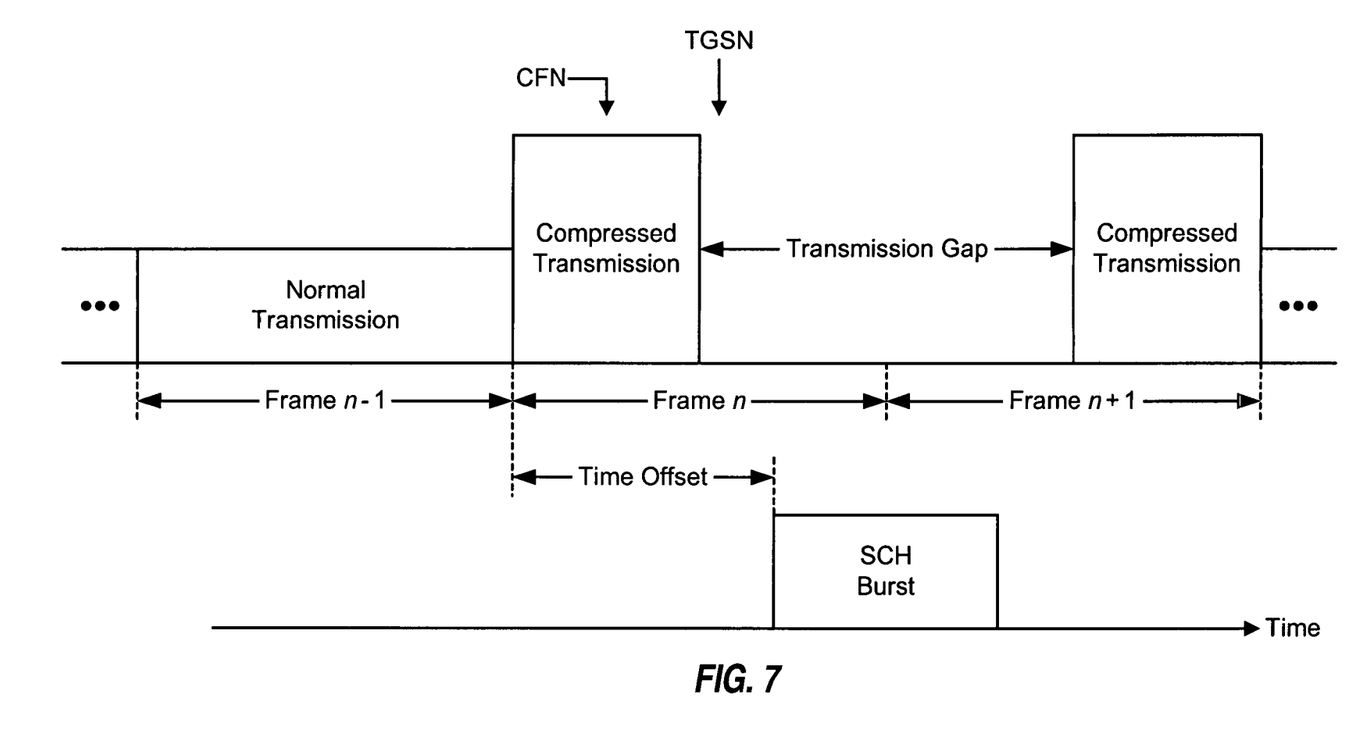
FIG. 7 shows timing measurement for one GSM cell.

FIG. 7 shows an embodiment for determining the timing of one GSM cell. The terminal can determine a connection frame number (CFN) of a radio frame containing a transmission gap based on a packet received in that radio frame. The CFN is an indicator as to which radio frame the first data was received on the uplink (or transmitted on the downlink) and can have a value within a range of 0 to 255. Each radio frame is 10 ms and includes 38,400 PN chips having indices of 0 through 38,399. The terminal can determine the difference between the start of the radio frame with the transmission gap and the start of the SCH burst for the GSM cell. This time difference is also called a time offset or a PN offset. In an embodiment, the timing of the GSM cell is given by the CFN for the radio frame with the transmission gap, the time offset, the TDMA frame number for the SCH burst, and the BSIC for the GSM cell. In another embodiment, the timing of the GSM cell is given by the TSGN for the transmission gap, the time offset between the TSGN and the start of the SCH burst, the TDMA frame number for the SCH burst, and the BSIC for the GSM cell. In yet another embodiment, the timing of the GSM cell is given by the SFN for the radio frame with the transmission gap, the time offset between the start of this radio frame and the start of the SCH burst, the TDMA frame number for the SCH burst, and the BSIC for the GSM cell. The timing of the GSM cell may also be given by other pieces of information. Furthermore, the GSM cell timing may indicate the time difference between any reference time for a W-CDMA cell and any reference time for the GSM cell.

The W-CDMA network may allocate a minimum number of transmission gaps that allow the terminal to make a sufficient number of measurements for the GSM candidate cells. The duration of each transmission gap may also be selected to be as small as possible. For example, a transmission gap may start $T_{sw1}$ prior to an SCH burst for a GSM cell and may have a duration of $T_{sw1}+T_{SCH}+T_{sw2}$, where $T_{sw1}$ is the amount of time needed to switch from W-CDMA to GSM, $T_{SCH}$ is the duration of the SCH (which is 4.615 ms), and $T_{sw2}$ is the amount of time needed to switch from GSM back to W-CDMA.

The terminal may send back the timing of the GSM candidate cells as well as other pertinent information (e.g., the BSIC and ARFCN for these GSM cells) in a Measurement Report message, which is described in 3GPP TS 04.18. In 3GPP TS 04.18 Version V8.10.0 dated June 2001, the Measurement Report message contains a set of three measurement fields for each GSM candidate cell reported by the terminal. The three measurement fields are for received signal strength, BCCH frequency, and BSIC for one GSM cell. This Measurement Report message may be modified to include one or more additional measurement fields for timing information for each reported GSM cell. For example, the additional measurement fields for each reported GSM cell may carry an SFN or a CFN for a radio frame with a transmission gap, and a time offset between the start of this radio frame and the start of an SCH burst.

For clarity, the gap allocation and cell measurement techniques have been specifically described for the W-CDMA and GSM networks. In general, these techniques may be used for any asynchronous communication networks in which each network does not have the timing of the other network. These networks may utilize different radio access technologies (e.g., W-CDMA, GSM, cdma2000, and so on).

Figure 8:
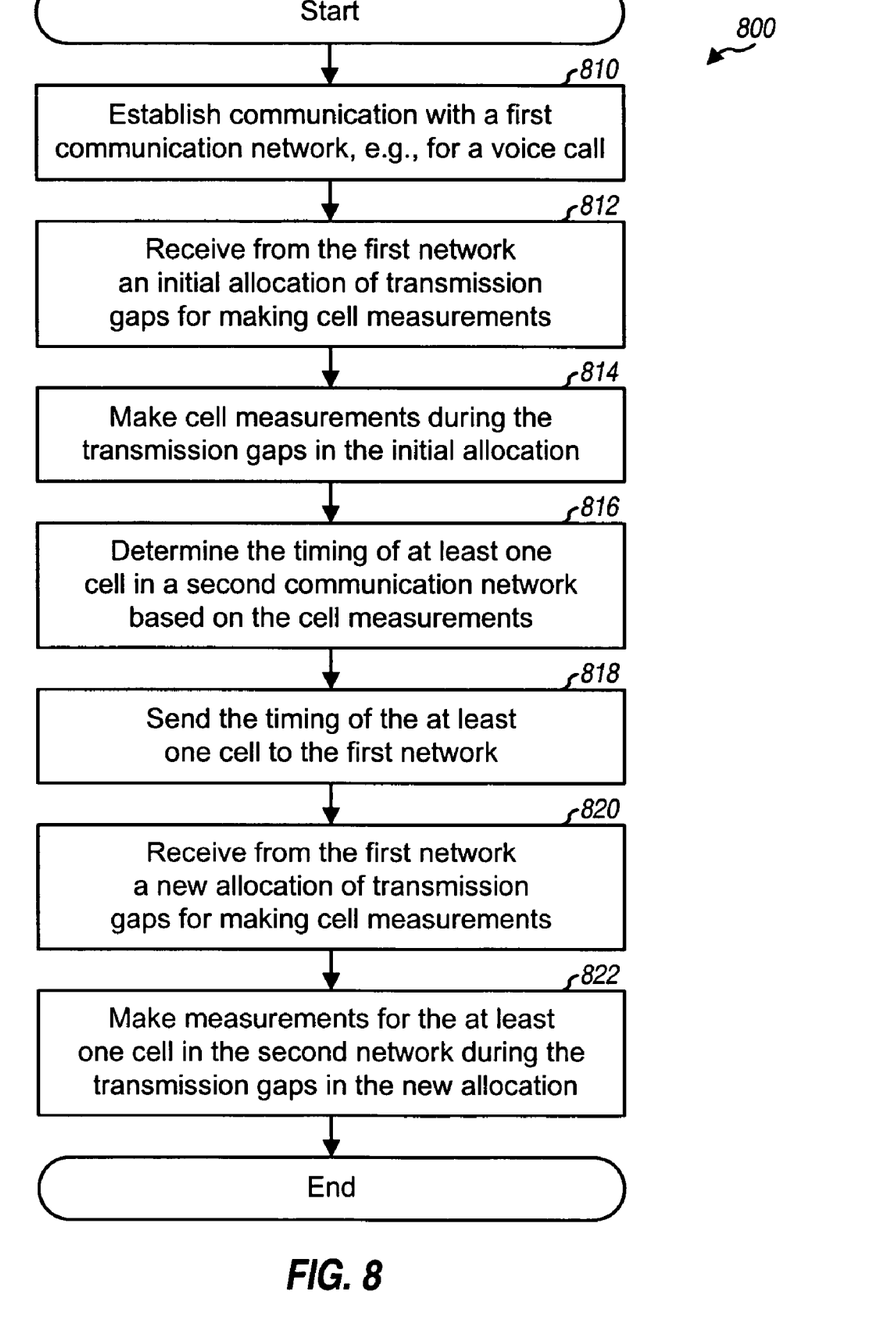
FIG. 8 shows a process for efficiently making cell measurements in asynchronous communication networks.

FIG. 8 shows a process 800 for efficiently making cell measurements in asynchronous communication networks. The terminal establishes communication with a first communication network, e.g., for a voice call or some other type of call (block 810). The terminal receives from the first network an initial allocation of transmission gaps for making cell measurements (block 812). The terminal makes measurements for cells during the transmission gaps in the initial allocation (block 814) and determines the timing of at least one cell in a second communication network that is asynchronous with the first network (block 816). The terminal then sends the timing of the at least one cell to the first network (block 818).

The terminal thereafter receives from the first network a new allocation of transmission gaps for making cell measurements (block 820). The transmission gaps in the new allocation are time aligned with synchronization bursts to be measured for the at least one cell reported by the terminal. The terminal makes measurements for the at least one cell during the transmission gaps in the new allocation (block 822).

Blocks 810 through 818 may be performed in different chronological orders than the order shown in FIG. 8. In an embodiment, the terminal makes measurements for cells in the second network prior to establishing communication with the first network and determines the timing of the cells based on these measurements. In another embodiment, the terminal obtains the timing of the cells in the second network based on prior measurements made for these cells. For both embodiments, the terminal may send to the first network the timing of the cells in the second network during establishment of communication with the first network. For these embodiments, the terminal makes cell measurements (block 814), determines the cell timing (block 816), and then sends the cell timing while establishing communication (blocks 812 and 818).

Figure 9:
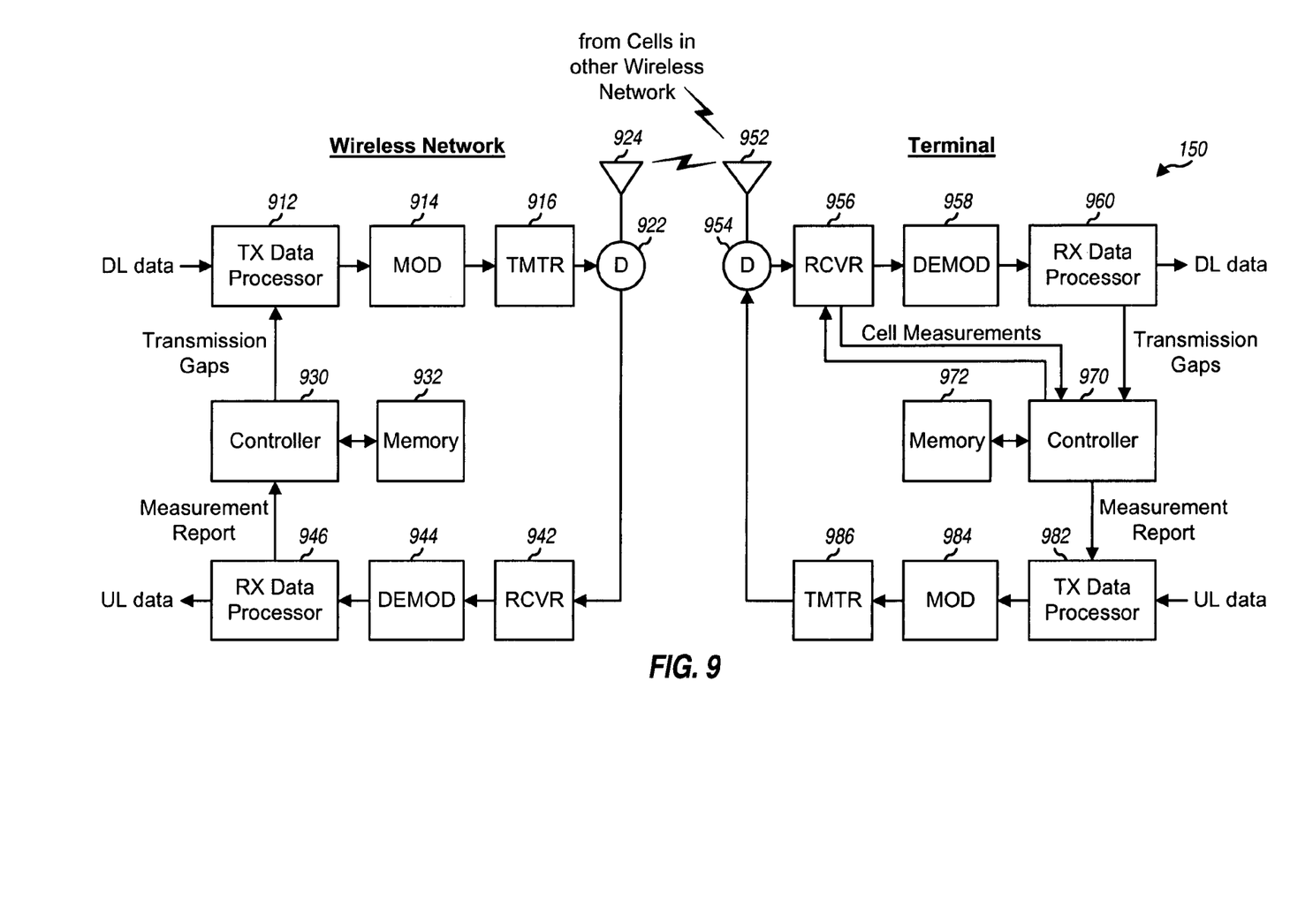
FIG. 9 shows a block diagram of a wireless network and a terminal.

FIG. 9 shows a block diagram of a wireless network (e.g., base station 122 and possibly RNC 124 in the W-CDMA network) and terminal 150. The wireless network can communicate with multiple terminals simultaneously. For simplicity, the following description is for communication between the wireless network and terminal 150.

On the downlink, at the wireless network, a transmit (TX) data processor 912 formats, encodes, and interleaves data and signaling for terminal 150. A modulator (MOD) 914 then channelizes/spreads, scrambles, and modulates the output of TX data processor 912 and provides a stream of chips. The processing of data and signaling in W-CDMA is described in 3GPP TS 25-321, TS 25-308, TS 25-212, and other 3GPP documents. A transmitter unit (TMTR) 916 conditions (e.g., converts to analog, amplifies, filters, and frequency upconverts) the stream of chips and generates a downlink signal. The downlink signal is routed through a duplexer (D) 922 and transmitted via an antenna 924 to terminal 150.

At terminal 150, the downlink signal is received by an antenna 952, routed through a duplexer 954, and provided to a receiver unit (RCVR) 956. Receiver unit 956 conditions (e.g., filters, amplifies, and frequency downconverts) the received signal and further digitizes the conditioned signal to generate samples. A demodulator (DEMOD) 958 descrambles, dechannelizes/despreads, and demodulates the samples and provides symbols. A receive (RX) data processor 960 deinterleaves and decodes the symbols, checks the received packets, and provides decoded data. The processing by demodulator 958 and RX data processor 960 is complementary to the processing by modulator 914 and TX data processor 912, respectively.

On the uplink, data and signaling are processed by a TX data processor 982, further processed by a modulator 984, conditioned by a transmitter unit 986, routed through duplexer 954, and transmitted via antenna 952. The uplink signal is received by antenna 924, routed through duplexer 922, conditioned by a receiver unit 942, processed by a demodulator 944, and further processed by an RX data processor 946 to recover the uplink data and signaling.

Controllers 930 and 970 control the operation at the wireless network and the terminal, respectively. Memory units 932 and 972 store data and codes used by controllers 930 and 970, respectively.

For gap allocation and cell measurement, the wireless network sends transmission gaps to the terminal in an appropriate message. At terminal 150, controller 970 receives the message from the wireless network and obtains the allocated transmission gaps. Controller 970 directs receiver 956 to make measurements for cells in another wireless network at time intervals determined by the allocated transmission gaps. Upon completing the cell measurements, controller 970 generates a measurement report and sends the report to the wireless network.

For clarity, the gap allocation and cell measurement techniques have been specifically described for W-CDMA and GSM networks. These techniques may also be used for other types of networks, which may implement other CDMA, TDMA, FDMA, and/or other standards.

The gap allocation and cell measurement techniques described herein may be implemented by various means. For example, these techniques may be implemented in hardware, software, or a combination thereof. For a hardware implementation, the processing units used to allocate transmission gaps may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. The processing units used to make cell measurements may also be implemented within one or more ASICs, DSPs, processors, and so on.

For a software implementation, the gap allocation and cell measurement techniques may be implemented with modules (e.g., procedures, functions, and so on) that perform the functions described herein. The software codes may be stored in a memory unit (e.g., memory unit 932 or 972 in FIG. 9) and executed by a processor (e.g., controller 930 or 970). The memory unit may be implemented within the processor or external to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of making cell measurements, comprising:
establishing communication with a first communication network;
determining timing of at least one cell in a second communication network that is asynchronous with the first communication network;
sending the timing of the at least one cell to the first communication network; and
receiving from the first communication network transmission gaps for making cell measurements, wherein locations of the transmission gaps are determined based on the timing of the at least one cell in the second communication network, wherein the transmission gaps are time aligned based on the timing with synchronization bursts to be measured for the at least one cell, wherein a duration of the transmission gaps is minimized based on a duration of the synchronization bursts and an amount of time to switch between the first communication network and the second communication network.

2. The method of claim 1, wherein the sending the timing of the at least one cell to the first communication network comprises
sending the timing of the at least one cell to the first communication network during establishment of communication with the first communication network.

3. The method of claim 2, wherein the timing of the at least one cell is determined based on measurements made for the at least one cell prior to the establishment of communication with the first communication network.

4. The method of claim 1, further comprising:
receiving from the first communication network an initial allocation of transmission gaps for making cell measurements at a terminal, wherein the initial allocation of transmission gaps are arbitrarily-placed with respect to transmissions indicating the timing of the at least one cell; and
making measurements for cells in the second communication network at the terminal during the transmission gaps in the initial allocation to determine the timing of the at least one cell in the second communication network.

5. The method of claim 1, further comprising:
making measurements for the at least one cell in the second communication network during the transmission gaps received from the first communication network.

6. The method of claim 5, further comprising:
determining updated timing of the at least one cell based on the measurements made during the transmission gaps received from the first communication network; and
sending to the first communication network a measurement report with the updated timing of the at least one cell.

7. The method of claim 1, wherein the timing of each of the at least one cell in the second communication network is given by a time difference between a reference time for the cell and a reference time for the first communication network.

8. The method of claim 1, wherein receiving the transmission gaps further comprises receiving a minimum number of transmission gaps that allow a sufficient number of measurements of the synchronization bursts to enable decoding of a code identifying the at least one cell.

9. The method of claim 1, wherein the at least one cell comprises a plurality of cells, and wherein receiving the transmission gaps further comprises receiving a number of different transmission gap sequences having the transmission gaps, wherein the number of different transmission gap sequences varies depending upon a number of the plurality of cells.

10. An apparatus comprising:
a controller operative to establish communication with a first communication network and to determine timing of at least one cell in a second communication network that is asynchronous with the first communication network;
a transmitter operative to send the timing of the at least one cell to the first communication network; and
a receiver operative to receive from the first communication network transmission gaps for making cell measurements, wherein locations of the transmission gaps are determined based on the timing of the at least one cell in the second communication network, wherein the transmission gaps are time aligned based on the timing with synchronization bursts to be measured for the at least one cell, wherein a duration of the transmission gaps is minimized based on a duration of the synchronization bursts and an amount of time to switch between the first communication network and the second communication network.

11. The apparatus of claim 10, wherein the receiver is operative to receive from the first communication network an initial allocation of transmission gaps for making cell measurements, wherein the initial allocation of transmission naps are arbitrarily-placed with respect to transmissions indicating the timing of the at least one cell, and wherein the controller is operative to initiate measurements for cells in the second communication network during the transmission gaps in the initial allocation and to determine the timing of the at least one cell in the second communication network based on the measurements, wherein the apparatus comprises a terminal.

12. The apparatus of claim 10, wherein the transmission gaps further comprise a minimum number of transmission gaps that allow a sufficient number of measurements of the synchronization bursts to enable decoding of a code identifying the at least one cell.

13. The apparatus of claim 10, wherein the at least one cell comprises a plurality of cells, and wherein the receiver is further operable to receive a number of different transmission gap sequences having the transmission gaps, wherein the number of different transmission gap sequences varies depending upon a number of the plurality of cells.

14. An apparatus comprising:
means for establishing communication with a first communication network;
means for determining timing of at least one cell in a second communication network that is asynchronous with the first communication network;
means for sending the timing of the at least one cell to the first communication network; and
means for receiving from the first communication network transmission gaps for making cell measurements, wherein locations of the transmission gaps are determined based on the timing of the at least one cell in the second communication network, wherein the transmission gaps are time aligned based on the timing with synchronization bursts to be measured for the at least one cell, wherein a duration of the transmission gaps is minimized based on a duration of the synchronization bursts and an amount of time to switch between the first communication network and the second communication network.

15. The apparatus of claim 14, wherein the means for sending the timing of the at least one cell to the first communication network comprises
means for sending the timing of the at least one cell to the first communication network during establishment of communication with the first communication network.

16. The apparatus of claim 14, further comprising:
means for receiving from the first communication network an initial allocation of transmission gaps for making cell measurements, wherein the initial allocation of transmission gaps are arbitrarily-placed with respect to transmissions indicating the timing of the at least one cell;
means for making measurements for cells in the second communication network during the transmission gaps in the initial allocation to determine the timing of the at least one cell in the second communication network; and
wherein the apparatus comprises a terminal.

17. The apparatus of claim 14, wherein the means for receiving the transmission gaps further comprises means for receiving a minimum number of transmission gaps that allow a sufficient number of measurements of the synchronization bursts to enable decoding of a code identifying the at least one cell.

18. The apparatus of claim 14, wherein the at least one cell comprises a plurality of cells, and wherein the means for receiving the transmission gaps further comprises means for receiving a number of different transmission gap sequences having the transmission gaps, wherein the number of different transmission gap sequences varies depending upon a number of the plurality of cells.

19. A method of making cell measurements, comprising:
determining timing of at least one Global System for Mobile Communications (GSM) cell in a GSM network;
sending the timing of the at least one GSM cell to a Wideband Code Division Multiple Access (W-CDMA) network; and
receiving from the W-CDMA network at least one transmission gap pattern sequence for making cell measurements, wherein locations of transmission gaps in the at least one transmission gap pattern sequence are determined based on the timing of the at least one GSM cell, wherein the transmission gaps are time aligned based on the timing with synchronization channel (SCH) bursts transmitted by the at least one GSM cell, wherein a duration of the transmission gaps is minimized based on a duration of the SCH bursts and an amount of time to switch between the W-CDMA network and the GSM network.

20. The method of claim 19, wherein the sending the timing of the at least one GSM cell to the W-CDMA network comprises
sending the timing of the at least one GSM cell to the W-CDMA network during establishment of communication with the W-CDMA network.

21. The method of claim 19, further comprising:
receiving from the W-CDMA network at least one initial transmission gap pattern sequence for making cell measurements at a terminal, wherein the at least one initial transmission gap pattern sequence comprises transmission gaps arbitrarily-placed with respect to transmissions indicating the timing of the at least one cell GSM cell; and
making cell measurements at the terminal during the transmission gaps in the at least one initial transmission gap pattern sequence to determine the timing of the at least one GSM cell.

22. The method of claim 19, wherein the timing of each GSM cell comprises a connection frame number (CFN) for a radio frame with a transmission gap, a TDMA frame number for a synchronization channel (SCH) burst, and a time offset between the radio frame and the SCH burst.

23. The method of claim 19, wherein the timing of each GSM cell comprises a system frame number (SFN) for a radio frame with a transmission gap, a TDMA frame number for a synchronization channel (SCH) burst, and a time offset between the radio frame and the SCH burst.

24. The method of claim 19, wherein receiving the at least one transmission gap pattern sequence further comprises receiving a minimum number of the transmission gaps that allow a sufficient number of measurements of the SCH bursts to enable decoding of a code identifying the at least one GSM cell.

25. The method of claim 19, wherein the at least one GSM cell comprises a plurality of cells, and wherein receiving the at least one transmission gap pattern sequence from the W-CDMA network further comprises receiving a number of different transmission gap pattern sequences, wherein the number of different transmission gap pattern sequences varies depending upon a number of the plurality of cells.

26. A method of supporting cell measurements, comprising:
receiving, at a first communication network from a terminal, timing of at least one cell in a second communication network that is asynchronous with the first communication network;
allocating the terminal with transmission gaps determined based on the timing of the at least one cell in the second communication network, wherein the transmission gaps are time aligned based on the timing with synchronization bursts to be measured for the at least one cell, wherein a duration of the transmission gaps is minimized based on a duration of the synchronization bursts and an amount of time to switch between the first communication network and the second communication network; and
sending the transmission gaps from the first communication network to the terminal.

27. The method of claim 26, further comprising:
establishing communication between the first communication network and the terminal, and wherein the timing of the at least one cell in the second communication network is received during the establishment of communication.

28. The method of claim 26, further comprising:
sending an initial allocation of transmission gaps from the first communication network to the terminal, wherein the initial allocation of transmission naps are arbitrarily-placed with respect to transmissions indicating the timing of the at least one cell, and wherein the timing of the at least one cell in the second communication network is determined by the terminal based on cell measurements made during the transmission gaps in the initial allocation.

29. The method of claim 26, wherein the terminal is allocated a particular number of transmission gaps determined based on the number of cells whose timing is received from the terminal.

30. The method of claim 26, wherein allocating the transmission gaps further comprises allocating a minimum number of transmission gaps that allow a sufficient number of measurements of the synchronization bursts to enable decoding of a code identifying the at least one cell.

31. The method of claim 26, wherein the at least one cell comprises a plurality of cells, and wherein allocating the transmission gaps further comprises allocating a number of different transmission gap sequences having the transmission gaps, wherein the number of different transmission gap sequences varies depending upon a number of the plurality of cells.

32. An apparatus comprising:
means for receiving, at a first communication network from a terminal, timing of at least one cell in a second communication network that is asynchronous with the first communication network;
means for allocating the terminal with transmission gaps determined based on the timing of the at least one cell in the second communication network, wherein the transmission gaps are time aligned based on the timing with synchronization bursts to be measured for the at least one cell, wherein a duration of the transmission gaps is minimized based on a duration of the synchronization bursts and an amount of time to switch between the first communication network and the second communication network; and means for sending the transmission gaps from the first communication network to the terminal.

33. The apparatus of claim 32, further comprising:
means for establishing communication between the first communication network and the terminal, and wherein the timing of the at least one cell in the second communication network is received during the establishment of communication.

34. The apparatus of claim 32, further comprising:
means for sending an initial allocation of transmission gaps from the first communication network to the terminal, wherein the initial allocation of transmission gaps are arbitrarily-placed with respect to transmissions indicating the timing of the at least one cell, and wherein the timing of the at least one cell in the second communication network is determined by the terminal based on cell measurements made during the transmission gaps in the initial allocation.

35. The apparatus of claim 32, wherein the means for allocating the transmission gaps further comprises means for allocating a minimum number of transmission gaps that allow a sufficient number of measurements of the synchronization bursts to enable decoding of a code identifying the at least one cell.

36. The apparatus of claim 32, wherein the at least one cell comprises a plurality of cells, and wherein the means for allocating the transmission gaps further comprises means for allocating a number of different transmission gap sequences having the transmission gaps, wherein the number of different transmission gap sequences varies depending upon a number of the plurality of cells.

37. A module for making cell measurements, comprising:
a tangible memory unit; and
a plurality of codes stored in the memory unit, the plurality of codes comprising:
code executable by a processor for establishing communication with a first communication network;
code executable by the processor for determining timing of at least one cell in a second communication network that is asynchronous with the first communication network;
code executable by the processor for sending the timing of the at least one cell to the first communication network; and
code executable by the processor for receiving from the first communication network transmission gaps for making cell measurements, wherein locations of the transmission gaps are determined based on the timing of the at least one cell in the second communication network, wherein the transmission gaps are time aligned based on the timing with synchronization bursts to be measured for the at least one cell, wherein a duration of the transmission gaps is minimized based on a duration of the synchronization bursts and an amount of time to switch between the first communication network and the second communication network.

38. The module of claim 37, wherein the plurality of codes further comprises:
code executable by the processor for receiving from the first communication network an initial allocation of transmission gaps for making cell measurements at a terminal, wherein the initial allocation of transmission gaps are arbitrarily-placed with respect to transmissions indicating the timing of the at least one cell; and
code executable by the processor for making measurements for cells in the second communication network at the terminal during the transmission gaps in the initial allocation to determine the timing of the at least one cell in the second communication network.

39. The module of claim 37, wherein the transmission gaps further comprise a minimum number of transmission gaps that allow a sufficient number of measurements of the synchronization bursts to enable decoding of a code identifying the at least one cell.

40. The module of claim 37, wherein the at least one cell comprises a plurality of cells, and further comprising code executable by the processor for receiving a number of different transmission gap sequences having the transmission gaps, wherein the number of different transmission gap sequences varies depending upon a number of the plurality of cells.

41. A module for making cell measurements, comprising:
a tangible memory unit; and
a plurality of codes stored in the memory unit, the plurality of codes comprising:
code executable by a processor for determining timing of at least one Global System for Mobile Communications (GSM) cell in a GSM network;
code executable by the processor for sending the timing of the at least one GSM cell to a Wideband Code Division Multiple Access (W-CDMA) network; and
code executable by the processor for receiving from the W-CDMA network at least one transmission gap pattern sequence for making cell measurements, wherein locations of transmission gaps in the at least one transmission gap pattern sequence are determined based on the timing of the at least one GSM cell, wherein the transmission gaps are time aligned based on the timing with synchronization channel (SCH) bursts transmitted by the at least one GSM cell, wherein a duration of the transmission gaps is minimized based on a duration of the SCH bursts and an amount of time to switch between the W-CDMA network and the GSM network.

42. The module of claim 41, wherein the plurality of codes further comprises:
code executable by the processor for receiving from the W-CDMA network at least one initial transmission gap pattern sequence for making cell measurements at a terminal, wherein the initial allocation of transmission gaps are arbitrarily-placed with respect to transmissions indicating the timing of the at least one cell; and
code executable by the processor for making cell measurements at the terminal during transmission gaps in the at least one initial transmission gap pattern sequence to determine the timing of the at least one GSM cell.

43. The module of claim 41, wherein the transmission gaps further comprise a minimum number of transmission gaps that allow a sufficient number of measurements of the synchronization bursts to enable decoding of a code identifying the at least one cell.

44. The module of claim 42, wherein the at least one cell comprises a plurality of cells, and further comprising code executable by the processor for receiving a number of different transmission gap sequences having the transmission gaps, wherein the number of different transmission gap sequences varies depending upon a number of the plurality of cells.

* * * * *